United States Patent
Tang et al.

(10) Patent No.: US 12,541,630 B2
(45) Date of Patent: Feb. 3, 2026

(54) METHOD FOR LAYOUT PLACEMENT AND ROUTING, CIRCUIT LAYOUT, ELECTRONIC DEVICE, AND STORAGE MEDIUM

(71) Applicant: CHANGXIN MEMORY TECHNOLOGIES, INC., Hefei (CN)

(72) Inventors: Li Tang, Hefei (CN); Chuanjiang Chen, Hefei (CN); Li Bai, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 853 days.

(21) Appl. No.: 17/844,727

(22) Filed: Jun. 21, 2022

(65) Prior Publication Data

US 2023/0267260 A1 Aug. 24, 2023

Related U.S. Application Data

(63) Continuation of application No. PCT/CN2022/078505, filed on Feb. 28, 2022.

(30) Foreign Application Priority Data

Feb. 18, 2022 (CN) .......................... 202210153271.5

(51) Int. Cl.
*G06F 30/392* (2020.01)
*G06F 30/394* (2020.01)

(52) U.S. Cl.
CPC .......... *G06F 30/392* (2020.01); *G06F 30/394* (2020.01)

(58) Field of Classification Search
CPC ............................ G06F 30/392; G06F 30/394
(Continued)

(56) References Cited

U.S. PATENT DOCUMENTS 6,826,737 B2 * 11/2004 Teig ...................... G06F 30/394
716/135
2002/0100007 A1 * 7/2002 Teig ...................... G06F 30/394
716/124
(Continued)

FOREIGN PATENT DOCUMENTS

CN 104701252 A 6/2015
CN 118820556 B * 11/2024 ........... G06F 16/904
(Continued)

*Primary Examiner* — Suresh Memula
(74) *Attorney, Agent, or Firm* — Kilpatrick Townsend & Stockton LLP (57) ABSTRACT

Embodiments relate to the field of semiconductors, and provide a method for layout placement and routing, a circuit layout, an electronic device, and a storage medium. The method includes: generating a plurality of layout units (100) arranged along a preset direction (X) based on a schematic circuit diagram, each of the plurality of layout units (100) having a plurality of connection nodes (101), and two connection nodes (101) at two ends of each of the plurality of layout units (100) being defined as assessment nodes; determining any one of the plurality of layout units (100) as a target layout unit, and obtaining a positional relationship between the connection nodes (101) in rest of the plurality of layout units having same node information as the assessment nodes in the target layout unit and the assessment nodes; and performing routing to electrically connect the connection nodes (101) having the same node information.

17 Claims, 6 Drawing Sheets

(58) Field of Classification Search
USPC .......................................................... 716/119
See application file for complete search history.

(56) References Cited

U.S. PATENT DOCUMENTS

| | | | | |
|---|---|---|---|---|
| 2002/0170027 | A1* | 11/2002 | Teig ...................... | G06F 30/392 |
| | | | | 716/122 |
| 2009/0288054 | A1* | 11/2009 | Okamoto ................ | G06F 30/39 |
| | | | | 716/122 |
| 2014/0157220 | A1* | 6/2014 | Arayama .............. | G06F 30/394 |
| | | | | 716/119 |
| 2016/0313638 | A1* | 10/2016 | Jung ......................... | G03F 1/68 |
| 2020/0394528 | A1* | 12/2020 | Makino .................... | G06N 5/01 |

FOREIGN PATENT DOCUMENTS

| | | | | | |
|---|---|---|---|---|---|
| EP | | 0612020 A2 | * | 8/1994 | |
| WO | WO-2023155239 A1 | * | 8/2024 | ........... | G06F 30/392 |

\* cited by examiner

| First Assessment Node | Second Assessment Node | Whether to flip |
|---|---|---|
| Example I | Example I | Not flip |
| Example I | Example II | Flip |
| Example I | Example III | Not flip |
| Example II | Example I | Not flip |
| Example II | Example II | Not flip |
| Example II | Example III | Not flip |
| Example III | Example I | Flip |
| Example III | Example II | Flip |
| Example III | Example III | Not flip |

METHOD FOR LAYOUT PLACEMENT AND ROUTING, CIRCUIT LAYOUT, ELECTRONIC DEVICE, AND STORAGE MEDIUM

CROSS-REFERENCE TO RELATED APPLICATION

Embodiments of the present disclosure is a continuation of PCT/CN2022/078505, filed on Feb. 28, 2022, which claim priority to Chinese Patent Application No. 2022101532715 titled "METHOD FOR LAYOUT PLACEMENT AND ROUTING, CIRCUIT LAYOUT, ELECTRONIC DEVICE, AND STORAGE MEDIUM" and filed on Feb. 18, 2022, the entire contents of which are incorporated herein by reference.

FIELD OF THE INVENTION

Embodiments of the present disclosure relate to, but are not limited to, a method for layout placement and routing, a circuit layout, an electronic device, and a storage medium.

BACKGROUND OF THE INVENTION

In layout placement and routing design, automatic layout placement may be achieved by means of existing electronic design automation (EDA) tools. That is, a plurality of layout units in the layout may be called and placed, or design engineers may manually place the plurality of layout units in the layout to optimize the placement of the plurality of layout units.

However, the above method is usually easy to cause a problem that input/output order of connection nodes at two ends of each of the plurality of layout units does not match a direction of a device corresponding to the layout unit, which may easily lead to increase of tracks, longer routing lengths, inconsistent direction of current and so on, thereby having a negative effect on quality of chip design.

SUMMARY OF THE INVENTION

According to some embodiments of the present disclosure, one aspect of the embodiments of the present disclosure provides a method for layout placement and routing. The method includes: generating a plurality of layout units arranged along a preset direction based on a schematic circuit diagram, each of the plurality of layout units having a plurality of connection nodes arranged along the preset direction, each of the plurality of connection nodes having corresponding node information, and two of the plurality of connection nodes at two ends of each of the plurality of layout units being defined as assessment nodes; determining any one of the plurality of layout units as a target layout unit, and obtaining position information of the assessment nodes in the target layout unit, the position information being configured for representing a positional relationship between the connection nodes in rest of the plurality of layout units having same node information as the assessment nodes in the target layout unit and the assessment nodes; determining whether to perform a position flip on the target layout unit based on the positional relationship, and flipping the target layout unit if the determination result is YES, such that the position information of the target layout unit flipped satisfies a preset condition; and performing routing to electrically connect the connection nodes having the same node information.

In some embodiments, in the preset direction, the connection nodes in the rest of the plurality of layout units having the same node information as a given one of the assessment nodes in the target layout unit are defined as a homogeneous node group. The preset condition includes: all the connection nodes in the homogeneous node group being distributed on one side of the given assessment node away from the other assessment node in the target layout unit, or the connection nodes in the homogeneous node group being distributed on two sides of the given assessment node.

In some embodiments, in the preset direction, the connection nodes in the rest of the plurality of layout units having the same node information as a given one of the assessment nodes in the target layout unit are defined as a homogeneous node group. The determining whether to perform a position flip on the target layout unit based on the positional relationship includes: determining whether at least one of the assessment nodes in the target layout unit satisfies a first condition; not flipping the target layout unit if the determination result is YES; and flipping the target layout unit to exchange positions of the two assessment nodes if the determination result is NO. The first condition is that in the preset direction, the connection nodes in the homogeneous node group are distributed on one side of the given assessment node away from the other assessment node in the target layout unit.

In some embodiments, the determining whether to perform a position flip on the target layout unit based on the positional relationship includes: determining whether the assessment nodes at two ends of the target layout unit satisfy a second condition; and not flipping the target layout unit if the determination result is YES. The second condition is that the connection nodes in the homogeneous node group are distributed on two sides of the given assessment node.

In some embodiments, the determining whether to perform a position flip on the target layout unit based on the positional relationship includes: determining whether the assessment nodes at the two ends of the target layout unit satisfy a second condition, wherein the second condition is that the connection nodes in the homogeneous node group are distributed on the two sides of the given assessment node; flipping the target layout unit if the determination result is YES; determining whether a length of the routing in a layout before flip is less than or equal to that of the routing in the layout after the flip; flipping the target layout unit again if the determination result is YES; and not flipping the target layout unit if the determination result is NO.

In some embodiments, before performing the routing, the method also includes: traversing all the plurality of layout units until each of the plurality of layout units completes the step of determining whether to perform a position flip on the target layout unit.

In some embodiments, all the plurality of layout units are traversed in sequence in the preset direction.

In some embodiments, any one of the plurality of layout units is determined as the target layout unit, and the two assessment nodes in the target layout unit are determined as a first assessment node and a second assessment node respectively. In the preset direction, rest of the plurality of connection nodes having the same node information as the first assessment node are defined as a first homogeneous node group, and rest of the plurality of connection nodes having the same node information as the second assessment node are defined as a second homogeneous node group. The obtaining position information of the assessment nodes in the target layout unit includes: obtaining first position information of the first assessment node, and obtaining second position information of the second assessment node. The determining whether to perform a position flip on the target layout unit based on the positional relationship includes: determining whether the position information conforms to at least one of the first position information representing that the connection nodes in the first homogeneous node group being distributed on one side of the first assessment node away from the second assessment node and the second position information representing that the connection nodes in the second homogeneous node group being distributed on one side of the second assessment node away from the first assessment node; and not flipping the target layout unit if the determination result is YES.

In some embodiments, the determining whether to perform a position flip on the target layout unit based on the positional relationship also includes: determining whether the position information conforms to the first position information representing that the connection nodes in the first homogeneous node group being distributed on two sides of the first assessment node and the connection nodes in the second homogeneous node group being distributed on two sides of the second assessment node; and not flipping the target layout unit if the determination result is YES.

In some embodiments, the determining whether to perform a position flip on the target layout unit based on the positional relationship also includes: flipping the target layout unit to exchange positions of the first assessment node and the second assessment node if the determination result is NO.

In some embodiments, the generating a plurality of layout units arranged along a preset direction includes: dividing the schematic circuit diagram into a plurality of circuit units according to functions; and generating a given one of the plurality of layout units corresponding to each of the plurality of circuit units by means of a physical layout unit library.

In some embodiments, the generating a given one of the plurality of layout units corresponding to each of the plurality of circuit units by means of a physical layout unit library includes: obtaining circuit data and layout data based on the circuit unit; obtaining all circuit node information based on the circuit data; obtaining all layout node information based on the layout data; and generating the given layout unit based on the circuit node information and the layout node information, wherein the node information of the plurality of connection node is generated based on the circuit node information and the layout node information.

In some embodiments, the node information includes an input port and/or an output port.

According to some embodiments of the present disclosure, another aspect of the embodiments of the present disclosure also provides a circuit layout, including: a plurality of circuit units arranged along a preset direction, each of the plurality of circuit units having a plurality of connection nodes arranged along the preset direction, each of the plurality of connection nodes having corresponding node information, and two of the plurality of connection nodes at two ends of each of the plurality of circuit units being defined as assessment nodes; wherein at least one of the plurality of circuit units serves as a first target circuit unit. In the preset direction, the connection nodes in rest of the plurality of circuit units having same node information as a given one of the assessment nodes in the first target circuit unit are defined as a homogeneous node group distributed on one side of the given assessment node away from the other assessment node in the first target circuit unit; and a routing configured to electrically connect the connection nodes having the same node information.

In some embodiments, the circuit layout also includes: at least one of the plurality of circuit units serving as a second target circuit unit. For the second target circuit unit, in the preset direction, the connection nodes in the rest of the plurality of circuit units having the same node information as the given assessment node in the second target circuit unit are distributed on two sides of the given assessment node.

In some embodiments, the node information includes an input port and/or an output port.

According to some embodiments of the present disclosure, yet another aspect of the embodiments of the present disclosure also provides an electronic device, including: at least one processor; and a memory communicatively connected to the at least one processor. The memory stores instructions executable by the at least one processor, and the instructions are executable by the at least one processor, whereby the at least one processor is configured to perform the method for layout placement and routing according to any one of the above embodiments.

According to some embodiments of the present disclosure, still another aspect of the embodiments of the present disclosure also provides a computer-readable storage medium storing a computer program thereon. The computer program is executable by a processor, whereby the method for layout placement and routing according to any one of the above embodiments is implemented.

The technical solutions provided by the embodiments of the present disclosure at least have following advantages.

Any one of the plurality of layout units is determined as a target layout unit, and two connection nodes at two ends of each of the plurality of layout units are defined as assessment nodes, and then a position between the connection nodes in rest of the plurality of layout units having the same node information as the assessment nodes in the target layout unit and the assessment nodes is compared, to determine whether to perform a position flip on the target layout unit, such that the position information of the target layout unit flipped satisfies the preset condition, thereby optimizing placement of the plurality of layout units. In one aspect, this is advantageous to reducing tracks occupied by the routing, and reducing opposite regions between adjacent routings to reduce interference between the adjacent routings. In another aspect, this is advantageous to shortening a length of the routing, reducing resistance of the routing in a circuit formed according to this layout, and improving consistency of direction of current in the circuit to reduce signal delay of the circuit.

BRIEF DESCRIPTION OF THE DRAWINGS

Exemplary descriptions are made to one or more embodiments with reference to pictures in the corresponding drawings, and these exemplary descriptions do not constitute limitations on the embodiments, and elements with the same reference numerals in the drawings are denoted as similar elements. Unless otherwise stated, the figures in the accompanying drawings do not constitute a scale limitation. To describe the technical solutions of the embodiments of the present disclosure or those of the prior art more clearly, the accompanying drawings required for describing the embodiments will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION OF THE EMBODIMENTS

The existing method for layout placement and routing needs to be optimized, and tracks occupied by a routing in the layout need to be reduced.

Embodiments of the present disclosure provide a method for layout placement and routing, a circuit layout, an electronic device, and a storage medium. In the method, a position between connection nodes in rest of a plurality of layout units having same node information as assessment nodes in a target layout unit and the assessment nodes is compared, to determine whether to perform a position flip on the target layout unit, such that position information of the target layout unit flipped satisfies a preset condition, thereby optimizing placement of the plurality of layout units. In one aspect, this is advantageous to reducing tracks occupied by a routing, and reducing opposite regions between adjacent routings to reduce interference between the adjacent routings. In another aspect, this is advantageous to shortening a length of the routing, reducing resistance of the routing in a circuit formed according to this layout, and improving consistency of direction of current in the circuit to reduce signal delay of the circuit.

To make the objectives, technical solutions and advantages of the embodiments of the present disclosure more clear, the embodiments of the present disclosure will be described in detail below with reference to the accompanying drawings. However, a person of ordinary skill in the art may understand that in the embodiments of the present disclosure, many technical details are put forward such that a reader may better understand the present disclosure. However, the technical solutions requested to be protected by the embodiments of the present disclosure may also be implemented even without these technical details or various variations and modifications based on the following embodiments.

Figure 1:
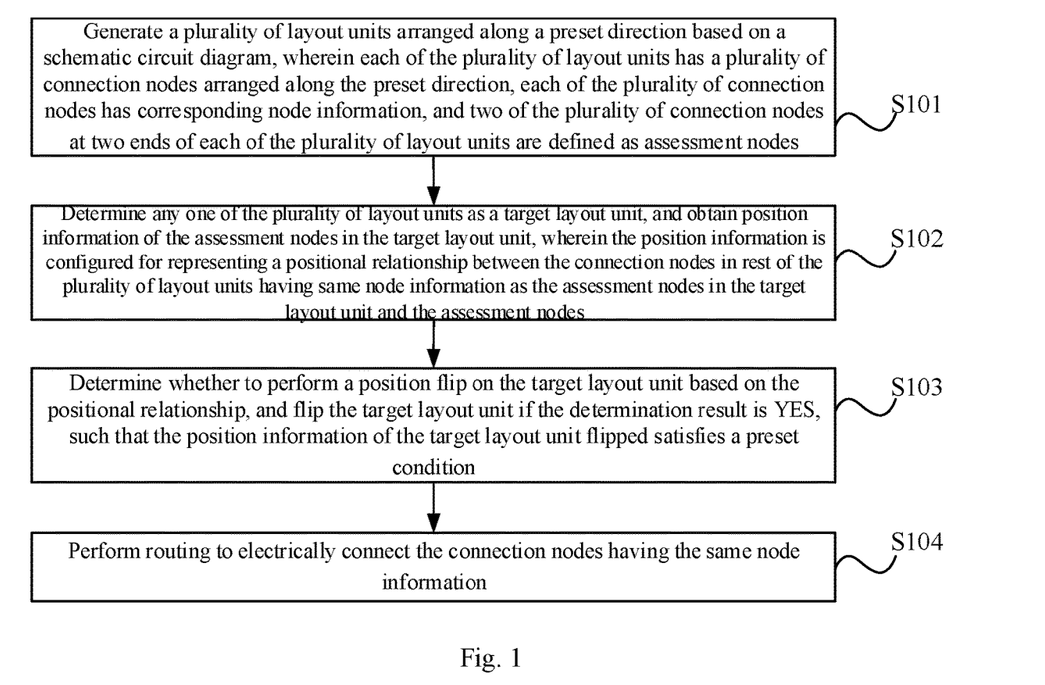
FIG. 1 is a flowchart of a method for layout placement and routing according to an embodiment of the present disclosure.
Figure 2:
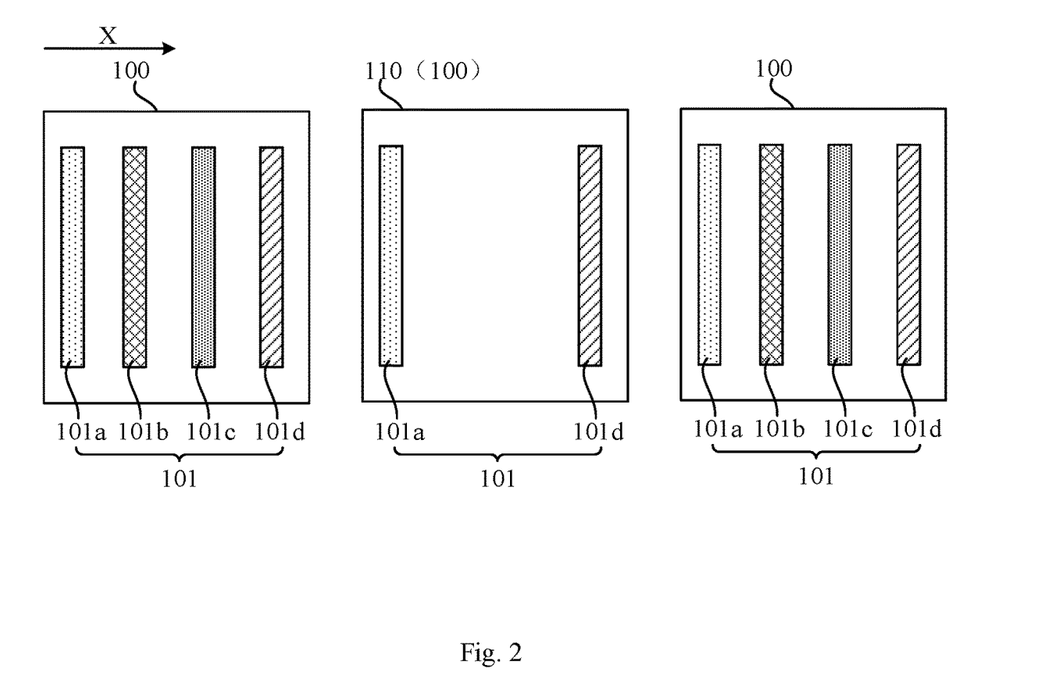
FIG. 2 to FIG. 4 are schematic diagrams showing three layout structures between a target layout unit and rest of layout units according to an embodiment of the present disclosure.
Figure 3:
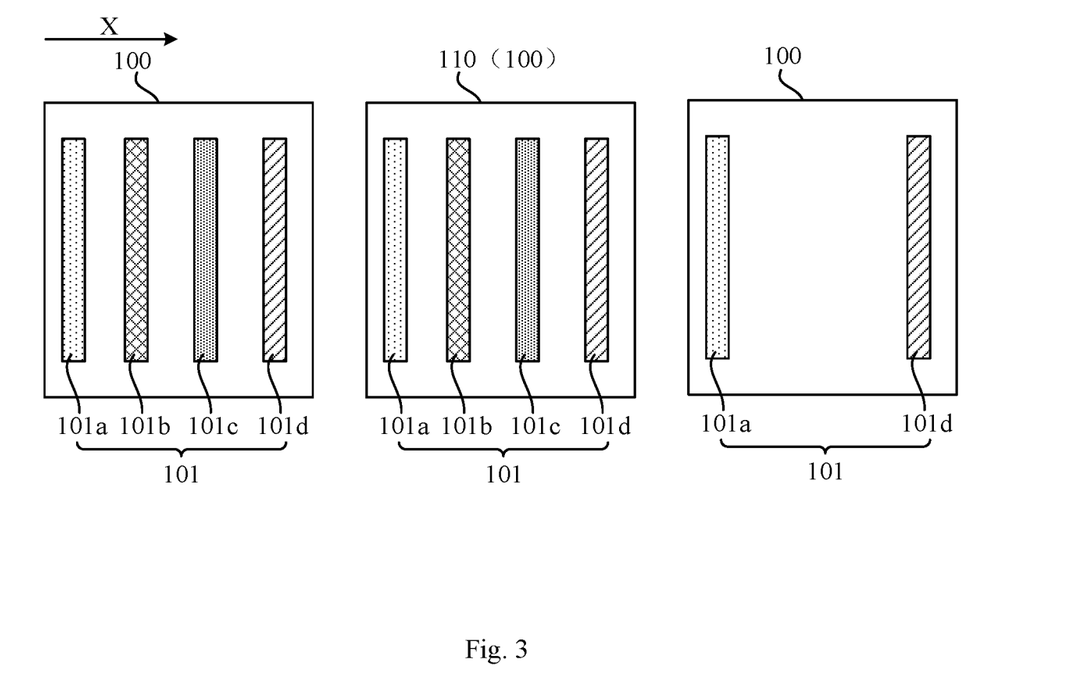
Figure 4:
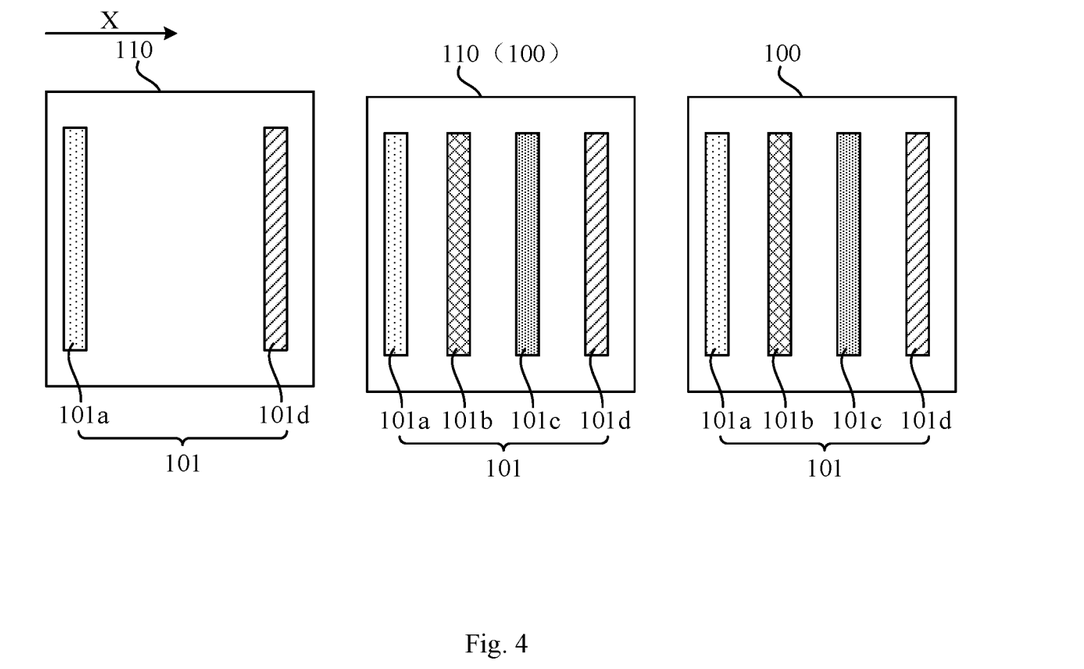
Figure 5:
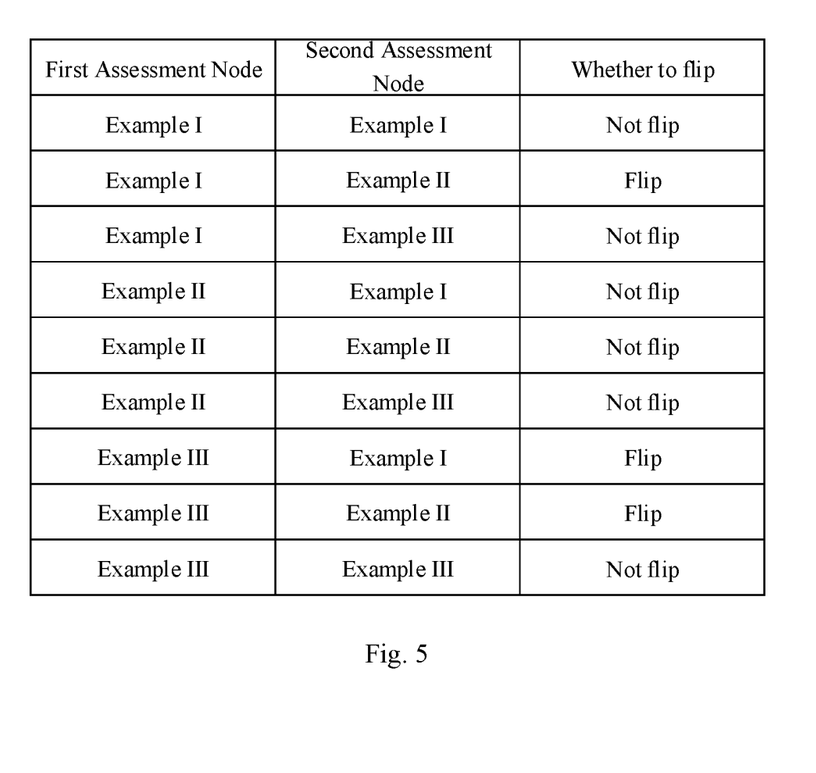
FIG. 5 is a schematic diagram showing a rule for determining whether to perform a position flip on the target layout unit according to an embodiment of the present disclosure.
Figure 6:
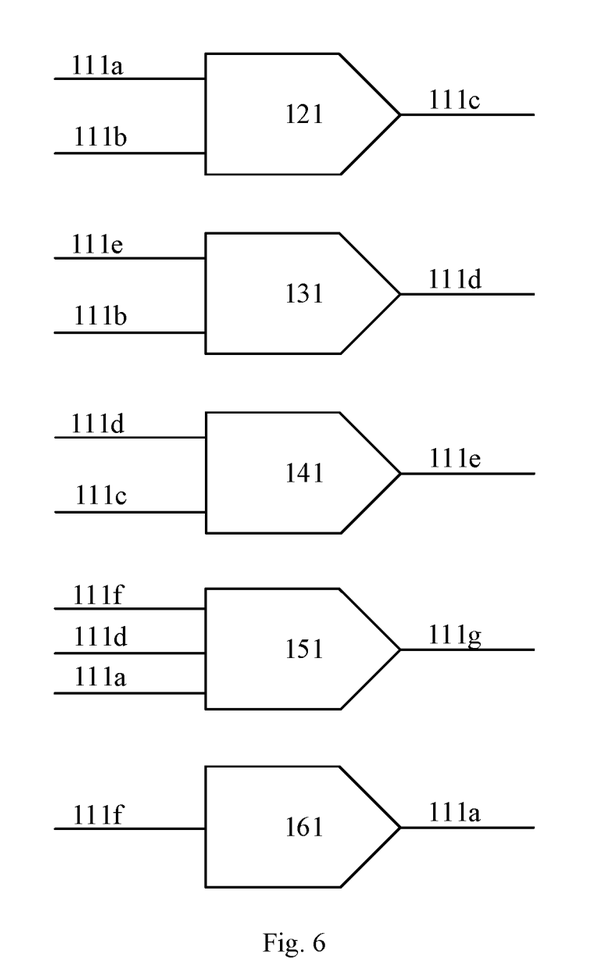
FIG. 6 is a schematic partial circuit diagram of a circuit according to an embodiment of the present disclosure.
Figure 7:
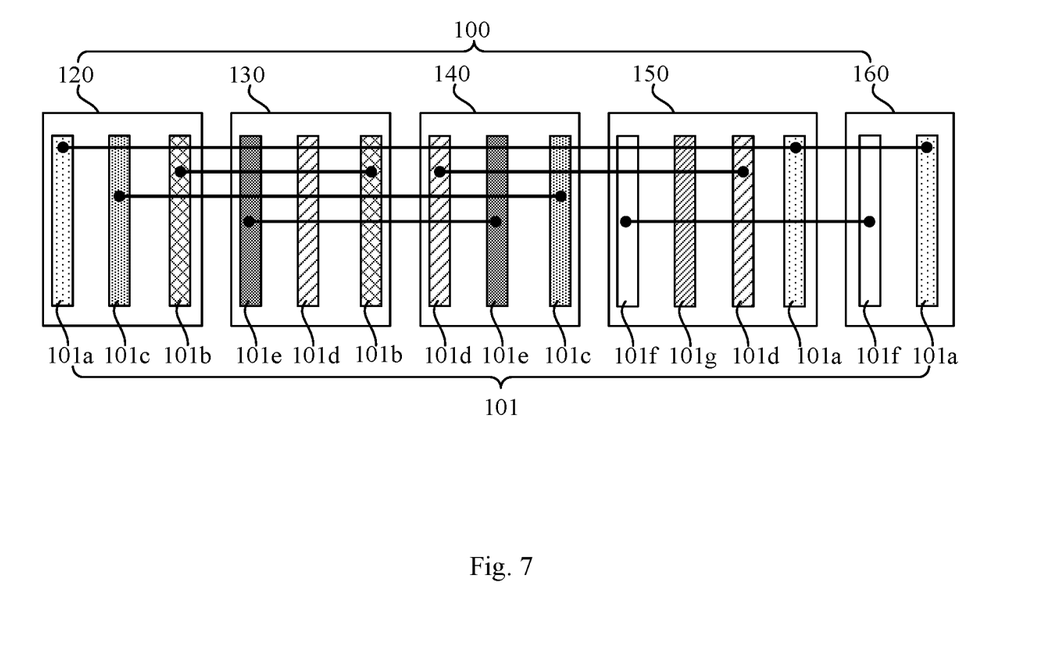
FIG. 7 is a schematic diagram showing an initial layout structure of a layout corresponding to the schematic partial circuit diagram provided in FIG. 6.
Figure 8:
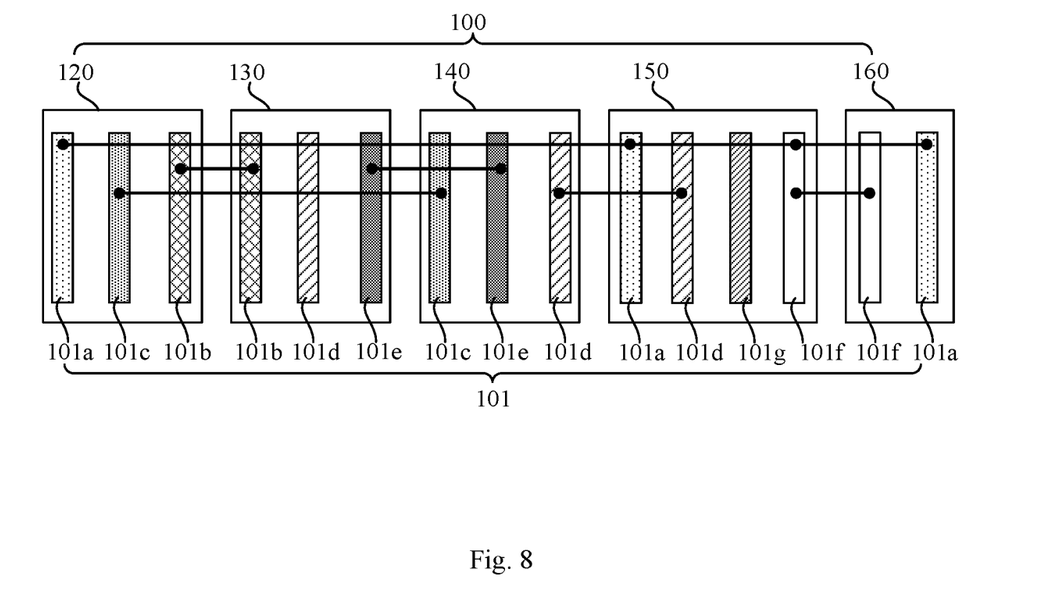
FIG. 8 is a schematic diagram showing a final layout structure formed by performing the method for layout placement and routing on the layout in FIG. 7 according to an embodiment of the present disclosure.

An embodiment of the present disclosure provides a method for layout placement and routing, and an embodiment of the present disclosure will be described in detail below with reference to the accompanying drawings. FIG. 1 is a flowchart of the method for layout placement and routing according to an embodiment of the present disclosure; FIG. 2 to FIG. 4 are schematic diagrams showing three layout structures between the target layout unit and the rest of the plurality of layout units according to an embodiment of the present disclosure; FIG. 5 is a schematic diagram showing a rule for determining whether to perform a position flip on the target layout unit according to an embodiment of the present disclosure;

FIG. 6 is a schematic partial circuit diagram of a circuit according to an embodiment of the present disclosure; FIG. 7 is a schematic diagram showing an initial layout structure of a layout corresponding to the schematic partial circuit diagram provided in FIG. 6; and FIG. 8 is a schematic diagram showing a final layout structure formed by performing the method for layout placement and routing on the layout in FIG. 7 according to an embodiment of the present disclosure.

Referring to FIG. 1 to FIG. 4, the method for layout placement and routing provided by an embodiment of the present disclosure may include following steps.

Step S101: generating a plurality of layout units 100 arranged along a preset direction X based on a schematic circuit diagram, wherein each of the plurality of layout units 100 has a plurality of connection nodes 101 arranged along the preset direction X, each of the plurality of connection nodes 101 has corresponding node information, and two of the plurality of connection nodes 101 at two ends of each of the plurality of layout units 100 are defined as assessment nodes.

It is to be noted that any one of the plurality of layout units 100 may have at least two connection nodes 101, wherein one of the at least two connection nodes 101 serves as an input port of this layout unit 100, and the other one of the at least two connection nodes 101 serves as an output port of this layout unit 100. Those skilled in the art may understand that each of the plurality of layout units 100 may include a plurality of connection nodes 101 serving as the input ports, and/or a plurality of connection nodes 101 serving as the output ports. In some embodiments, referring to FIG. 2 to FIG. 4, an example is taken where one of the plurality of layout units 100 may have four connection nodes 101 or two connection nodes 101. In practical applications, number of connection nodes 101 in any one of the plurality of layout units 100 is not limited, as long as the number of connection nodes 101 in any one of the plurality of layout units 100 is greater than or equal to 2.

With continued reference to FIG. 2 to FIG. 4, the four connection nodes 101 in this layout unit 100 may be a first connection node 101a, a second connection node 101b, a third connection node 101c, and a fourth connection node 101d in sequence along the preset direction X. It is to be noted that for ease of subsequent description, one side pointing along the preset direction X is defined as a right side, and one side starting from the preset direction X is defined as a left side. Therefore, for any one of the plurality of layout units 100, the two connection nodes 101 at two ends of this layout unit 100 are defined as the assessment nodes. That is, the first connection node 101a on a leftmost side and the fourth connection node 101d on a rightmost side of this layout unit 100 serve as the assessment nodes.

In some embodiments, the step of generating a plurality of layout units 100 arranged along a preset direction X may include: dividing the schematic circuit diagram into a plurality of circuit units according to functions; and generating a given one of the plurality of layout units 100 corresponding to each of the plurality of circuit units by means of a physical layout unit library. In this way, it is advantageous to ensuring consistency between a layout designed and a circuit formed according to the layout.

The step of generating a given one of the plurality of layout units 100 corresponding to each of the plurality of circuit units by means of a physical layout unit library may include: obtaining circuit data and layout data based on the circuit unit; obtaining all circuit node information based on the circuit data; obtaining all layout node information based on the layout data; and generating the given layout unit 100 based on the circuit node information and the layout node information, wherein the node information is generated based on the circuit node information and the layout node information. In one example, based on the circuit node information, it may be known whether the node information is the input port or the output port in the given layout unit 100; and based on the layout node information, the position information of the node information in the given layout unit 100 may be known, to determine whether the connection nodes 101 corresponding to the node information are the assessment nodes.

In some embodiments, the node information includes an input port and/or an output port. That is, referring to FIG. 2 to FIG. 4, the node information of the first connection node 101a includes: information indicating that the first connection node 101a is the input port or the output port; the node information of the second connection node 101b includes: information indicating that the second connection node 101b is the input port or the output port; the node information of the third connection node 101c includes: information indicating that the third connection node 101c is the input port or the output port; and the node information of the fourth connection node 101d includes: information indicating that the fourth connection node 101d is the input port or the output port.

In some embodiments, the node information includes an node identifier, and different layout units 100 may include connection nodes having the same node identifier. Based on the circuit data, the connection nodes that need to be interconnected in different layout units 100 by routing may be determined. The connection nodes that need to be interconnected by routing may be represented in the circuit data and the layout by means of the node identifier. That is, the connection nodes having the same node identifier need to be interconnected by routing. For example, among a number of connection nodes having the same node identifier, some connection nodes are the input ports in one layout unit 100, and some connection nodes are the output ports in another layout unit 100. When routing, these connection nodes may be interconnected by routing according to the same node identifier thereof. In one example, referring to FIG. 2 to FIG. 4, the first connection node 101a may be the input port of the layout unit 100 where the first connection node 101a is positioned, and the fourth connection node 101d may be the output port of the layout unit 100 where the fourth connection node 101d is positioned. It is to be noted that in practical applications, for the layout unit 100 including four connection nodes 101 in FIGS. 2 to 4, it is only needed that at least one of the four connection nodes 101 serves as the input port, and at least one of the four connection nodes 101 serves as the output port.

Step S102: determining any one of the plurality of layout units 100 as a target layout unit 110, and obtaining position information of the assessment nodes in the target layout unit 110, wherein the position information is configured for representing a positional relationship between the connection nodes 101 in rest of the plurality of layout units 100 having same node information as the assessment nodes in the target layout unit 110 and the assessment nodes.

In some embodiments, the node information includes an input port and/or output port and a node identifier. When two layout units include connection nodes having the same node identifier, no matter whether both the two connection nodes are the input ports and/or outputs port, it may be considered that the two connection nodes have the same node information.

In some embodiments, referring to FIG. 2 to FIG. 4, the first connection node 101a and the fourth connection node 101d in the target layout unit 110 may be determined as the assessment nodes. When the first connection node 101a in the target layout unit 110 is determined as the assessment node, the position information may represent a positional relationship between the first connection node 101a in the target layout unit 110 and the first connection nodes 101a in rest of the plurality of layout units 100. For example, the positional relationship may indicate that the first connection nodes 101a in the rest of the plurality of layout units 100 are positioned on the left or right side of the first connection node 101a in the target layout unit 110. When the fourth connection node 101d in the target layout unit 110 is determined as the assessment node, the position information may represent a positional relationship between the fourth connection node 101d in the target layout unit 110 and the fourth connection nodes 101d in rest of the plurality of layout units 100. For example, the positional relationship may indicate that the fourth connection nodes 101d in the rest of the plurality of layout units 100 are positioned on the left or right side of the fourth connection node 101d in the target layout unit 110.

In some embodiments, any one of the plurality of layout units 100 is determined as the target layout unit 110, and the two assessment nodes in the target layout unit 110 is determined as a first assessment node and a second assessment node, respectively. In the preset direction X, rest of the plurality of connection nodes having the same node information as the first assessment node is defined as a first homogeneous node group, and rest of the plurality of connection nodes having the same node information as the second assessment node is defined as a second homogeneous node group. The obtaining position information of the assessment nodes in the target layout unit includes: obtaining first position information of the first assessment node, and obtaining second position information of the second assessment node.

In some embodiments, referring to FIG. 2 to FIG. 4, the first connection node 101a positioned on the left side of the target layout unit 110 may be determined as the first assessment node, and the fourth connection node 101d positioned on the right side of the target layout unit 110 may be determined as the second assessment node.

Step S103: determining whether to perform a position flip on the target layout unit 110 based on the positional relationship, and flipping the target layout unit 110 if the determination result is YES, such that the position information of the target layout unit 110 flipped satisfies a preset condition.

Referring to FIG. 2 to FIG. 4, in some embodiments, in the preset direction X, the connection nodes 101 in the rest of the plurality of layout units 100 having the same node information as a given one of the assessment nodes in the target layout unit 110 are defined as a homogeneous node group. The preset condition includes: all the connection nodes 101 in the homogeneous node group being distributed on one side of the given assessment node away from the other assessment node in the target layout unit 110, or the connection nodes 101 in the homogeneous node group being distributed on two sides of the given assessment node.

In this way, it is advantageous to preventing the connection nodes 101 in the homogeneous node group from being distributed on one side of the given assessment node close to the other assessment node in the target layout unit 110, i.e., allowing the connection nodes 101 in the homogeneous node group to get as close as possible to the given assessment node. When performing routing to electrically connect the connection nodes 101 having the same node information, it is advantageous to shortening a distance between the connection nodes 101 in the homogeneous node group and the given assessment node to reduce tracks occupied by the routing, and it is advantageous to reducing opposite regions between adjacent routings to reduce interference between the adjacent routings. Moreover, a length of the routing may be shortened, which is advantageous to reducing resistance of the routing in a circuit formed according to this layout, and improving consistency of direction of current in the circuit to reduce signal delay of the circuit.

In some embodiments, the step of determining whether to perform a position flip on the target layout unit 110 based on the positional relationship may include: determining whether at least one of the assessment nodes in the target layout unit 110 satisfies a first condition; not flipping the target layout unit 110 if the determination result is YES; and flipping the target layout unit 110 to exchange positions of the two assessment nodes if the determination result is NO. The first condition is that in the preset direction X, the connection nodes 101 in the homogeneous node group are distributed on one side of the given assessment node away from the other assessment node in the target layout unit 110.

In some examples, referring to FIG. 3, if the first connection node 101a in the target layout unit 110 is determined as the assessment node, the connection nodes 101 in the homogeneous node group are the first connection nodes 101a in the rest of the plurality of layout units 100. In FIG. 3, the first connection node 101a in the target layout unit 110 is positioned on the left side of the target layout unit 110, and the first connection nodes 101a in the rest of the plurality of layout units 100 are all positioned on the left side of the first connection node 101a in the target layout unit 110. In this case, the first condition is satisfied. That is, in the preset direction X, the first connection nodes 101a in the homogeneous node group are distributed on one side of the given assessment node away from the other assessment node in the target layout unit 110. In some other examples, referring to FIG. 4, if the fourth connection node 101d in the target layout unit 110 is determined as the assessment node, the connection nodes 101 in the homogeneous node group are the fourth connection nodes 101d in the rest of the plurality of layout units 100. In FIG. 4, the four connection node 101d in the target layout unit 110 is positioned on the right side of the target layout unit 110, and the fourth connection nodes 101d in the rest of the plurality of layout units 100 are all positioned on the right side of the fourth connection node 101d in the target layout unit 110. In this case, the first condition is satisfied. That is, in the preset direction X, the first connection nodes 101a in the homogeneous node group are distributed on one side of the given assessment node away from the other assessment node in the target layout unit 110. Thus, the target layout unit 110 does not need to be flipped in the examples in FIGS. 3 and 4.

It is to be noted that in FIG. 3 and FIG. 4, examples are taken where one of the assessment nodes in the target layout unit 110 satisfies the first condition, but the other assessment node in the target layout unit 110 does not satisfy the first condition. In practical applications, there exists a case where both the two assessment nodes in the target layout unit 110 satisfy the first condition. In this case, the target layout unit 110 is not flipped. For example, for the first connection node 101a positioned on the left side of the target layout unit 110, the first connection nodes 101a in the rest of the plurality of layout units 100 are all positioned on the left side of the first connection node 101a in the target layout unit 110, and none of the layout units 100 on the left side of the target layout unit 110 is provided with the fourth connection node 101d. That is, for the fourth connection node 101d positioned on the right side of the target layout unit 110, the layout units 100 provided with the fourth connection nodes 101d are all positioned on the right side of the target layout unit 110.

In some embodiments, on the basis of determining whether at least one assessment node in the target layout unit 110 satisfies the first condition, the step of determining whether to perform a position flip on the target layout unit 110 based on the positional relationship may also include: determining whether the assessment nodes at two ends of the target layout unit 110 satisfy a second condition; and not flipping the target layout unit 110 if the determination result is YES. The second condition is that the connection nodes in the homogeneous node group are distributed on two sides of the given assessment node.

In some examples, referring to FIG. 2, no matter the first connection node 101a or the fourth connection node 101d in the target layout unit 110 is determined as the assessment node, the assessment node does not satisfy the first condition. Moreover, if the first connection node 101a on the left side of the target layout unit 110 is determined as the assessment node, the connection nodes 101 in the homogeneous node group are the first connection nodes 101a in the rest of the plurality of layout units 100. In FIG. 2, the first connection nodes 101a in the rest of the plurality of layout units 100 are distributed on two sides of the first connection node 101a in the target layout unit 110. In this case, the second condition is satisfied. If the fourth connection node 101d on the right side of the target layout unit 110 is determined as the assessment node, the connection nodes 101 in the homogeneous node group are the fourth connection nodes 101d in the rest of the plurality of layout units 100. In FIG. 2, the fourth connection nodes 101d in the rest of the plurality of layout units 100 are distributed on two sides of the fourth connection node 101d in the target layout unit 110. In this case, the second condition is satisfied. Thus, in the example in FIG. 2, the target layout unit 110 does not need to be flipped.

In other embodiments, when both the assessment nodes at the two ends of the target layout unit satisfy the second condition, the target layout unit is also flipped. Next, it is determined whether a length of the routing in a layout before flip is less than or equal to that of the routing in the layout after the flip. The target layout unit is flipped again if the determination result is YES. However, the target layout unit is not flipped again if the determination result is NO. In this way, it is advantageous to further reducing the tracks occupied by the routing and shortening the length of the routing.

In some embodiments, the two assessment nodes in the target layout unit 110 may be determined as a first assessment node and a second assessment node respectively. In the preset direction X, rest of the plurality of connection nodes having the same node information as the first assessment node are defined as a first homogeneous node group, and rest of the plurality of connection nodes having the same node information as the second assessment node are defined as a second homogeneous node group. On the basis of obtaining first position information of the first assessment node and obtaining second position information of the second assessment node, the step of determining whether to perform a position flip on the target layout unit based on the positional relationship may include: determining whether the position information conforms to at least one of the first position information representing that the connection nodes in the first homogeneous node group are all distributed on one side of the first assessment node away from the second assessment node and the second position information representing that the connection nodes in the second homogeneous node group are all distributed on one side of the second assessment node away from the first assessment node; and not flipping the target layout unit 110 if the determination result is YES.

It is to be understood that for the target layout unit 110, when the connection nodes in the first homogeneous node group are all distributed on one side of the first assessment node away from the second assessment node or the connection nodes in the second homogeneous node group are all distributed on one side of the second assessment node away from the first assessment node, the target layout unit 110 does not need to be flipped. When the connection nodes in the first homogeneous node group are all distributed on one side of the first assessment node away from the second assessment node and the connection nodes in the second homogeneous node group are all distributed on one side of the second assessment node away from the first assessment node, the target layout unit 110 does not need to be flipped either.

The step of determining whether to perform a position flip on the target layout unit 110 based on the positional relationship may also include: determining whether the position information conforms to the first position information representing that the connection nodes 101 in the first homogeneous node group being distributed on two sides of the first assessment node and the connection nodes 101 in the second homogeneous node group being distributed on two sides of the second assessment node; not flipping the target layout unit 110 if the determination result is YES; and flipping the target layout unit 110 to exchange positions of the first assessment node and the second assessment node if the determination result is NO. It is compared whether a length of the routing in a layout before flip is less than or equal to that of the routing in the layout after the flip. The target layout unit is flipped again if the comparison result is YES. However, the target layout unit is not flipped again if the comparison result is NO. In this way, it is advantageous to further reducing the tracks occupied by the routing and shortening the length of the routing.

In other embodiments, it is determined whether the position information conforms to at least one of the first position information representing that the connection nodes in the first homogeneous node group are all distributed on one side of the first assessment node away from the second assessment node and the second position information representing that the connection nodes in the second homogeneous node group are all distributed on one side of the second assessment node away from the first assessment node. The target layout unit is flipped to exchange the positions of the first assessment node and the second assessment node if the determination result is NO. It is compared whether a length of the routing in a layout before flip is less than or equal to that of the routing in the layout after the flip. The target layout unit is flipped again if the comparison result is YES. However, the target layout unit is not flipped again if the comparison result is NO. In this way, it is advantageous to further reducing the tracks occupied by the routing and shortening the length of the routing.

The step of determining whether to perform a position flip on the target layout unit 110 based on the positional relationship will be described in detail below by means of three examples.

For ease of subsequent description, the first connection node 101a on the left side of the target layout unit 110 may be determined as the first assessment node, and the fourth connection node 101d on the right side of the target layout unit 110 may be determined as the second assessment node.

In Example I, referring to FIG. 2, for the first assessment node in the target layout unit 110, the first connection nodes 101a in the rest of the plurality of layout units 100 are distributed on two sides of the first assessment node; and for the second assessment node in the target layout unit 110, the fourth connection nodes 101d in the rest of the plurality of layout units 100 are distributed on two sides of the second assessment node. In this case, the target layout unit 110 does not need to be flipped.

In Example II, referring to FIG. 3, for the first assessment node in the target layout unit 110, the first connection nodes 101a in the rest of the plurality of layout units 100 are distributed on the left side of the first assessment node, i.e., on one side of the first assessment node away from the second assessment node. In this case, the target layout unit 110 does not need to be flipped.

In Example III, referring to FIG. 4, for the second assessment node in the target layout unit 110, the fourth connection nodes 101d in the rest of the plurality of layout units 100 are distributed on the right side of the second assessment node, i.e., on one side of the second assessment node away from the first assessment node. In this case, the target layout unit 110 does not need to be flipped.

In one example, with reference to FIGS. 2 to 5, for the target layout unit 110, there exist nine cases in FIG. 5. Referring to FIG. 5, when the first assessment node and the second assessment node are both in the case of Example I, the target layout unit 110 does not need to be flipped. When the first assessment node is in the case of Example I and the second assessment node is in the case of Example II, the target layout unit 110 needs to be flipped. When the first assessment node is in the case of Example I and the second assessment node is in the case of Example III, the target layout unit 110 does not need to be flipped. When the first assessment node is in the case of Example II and the second assessment node is in the case of Example I, the target layout unit 110 does not need to be flipped. When the first assessment node is in the case of Example II and the second assessment node is in the case of Example II, the target layout unit 110 does not need to be flipped. When the first assessment node is in the case of Example II and the second assessment node is in the case of Example III, the target layout unit 110 does not need to be flipped. When the first assessment node is in the case of Example III and the second assessment node is in the case of Example I, the target layout unit 110 needs to be flipped. When the first assessment node is in the case of Example III and the second assessment node is in the case of Example II, the target layout unit 110 needs to be flipped. When the first assessment node is in the case of Example III and the second assessment node is in the case of Example III, the target layout unit 110 does not need to be flipped.

In some embodiments, before performing the routing, the step of determining whether to perform a position flip on the target layout unit 110 based on the positional relationship may also include: traversing all the plurality of layout units 100 until each of the plurality of layout units 100 completes the step of determining whether to perform a position flip on the target layout unit 110. It is to be understood that each of the plurality of layout units 100 is determined as the target layout unit 110 in sequence to complete the above step of flip determination. This is advantageous to optimizing layout placement and routing in an all-round way.

In some embodiments, all the plurality of layout units 100 may be traversed in sequence along the preset direction X, which is advantageous to avoiding omission of individual layout units 100 and ensuring that the above step of flip determination has been performed on each of the plurality of layout units 100.

Step S104: performing routing to electrically connect the connection nodes 101 having the same node information.

In one embodiment, referring to FIG. 6 to FIG. 8, wherein FIG. 6 is a schematic partial circuit diagram of a circuit according to an embodiment of the present disclosure; FIG. 7 is a schematic diagram showing an initial layout structure of a layout corresponding to the schematic partial circuit diagram provided in FIG. 6; and FIG. 8 is a schematic diagram showing a final layout structure formed by performing the method for layout placement and routing on the layout in FIG. 7 according to an embodiment of the present disclosure.

Referring to FIG. 6, the circuit may include five circuit units, and the five circuit units include seven types of circuit nodes. The five circuit units may be a first circuit unit 121, a second circuit unit 131, a third circuit unit 141, a fourth circuit unit 151, and a fifth circuit unit 161 in sequence. The seven types of circuit nodes may include a first circuit node 111a, a second circuit node 111b, a third circuit node 111c, a fourth circuit node 111d, a fifth circuit node 111e, a sixth circuit node 111f, and a seventh circuit node 111g. The first circuit unit 121 includes a first circuit node 111a, a third circuit node 111c, and a second circuit node 111b in sequence. The second circuit unit 131 includes a fifth circuit node 111e, a fourth circuit node 111d, and the second circuit node 111b in sequence. The third circuit unit 141 includes the fourth circuit node 111d, the fifth circuit node 111e, and the third circuit node 111c in sequence. The fourth circuit unit 151 includes a sixth circuit node 111f, a seventh circuit node 111g, the fourth circuit node 111d, and the first circuit node 111a in sequence. The fifth circuit unit 161 includes the sixth circuit node 111f and the first circuit node 111a in sequence.

Referring to FIG. 7, the layout may include five layout units 100, and the five layout units 100 include seven types of connection nodes 101. Along the preset direction X, the five layout units 100 may be a first layout unit 120, a second layout unit 130, a third layout unit 140, a fourth layout unit 150, and a fifth layout unit 160 in sequence. The seven types of connection nodes 101 may include the first connection node 101a, the second connection node 101b, the third connection node 101c, the fourth connection node 101d, a fifth connection node 101e, a sixth connection node 101f, and a seventh connection node 101g. Along the preset direction X, the first layout unit 120 includes the first connection node 101a, the third connection node 101c, and the second connection node 101b in sequence. The second layout unit 130 includes the fifth connection node 101e, the fourth connection node 101d, and second connection node 101b in sequence. The third layout unit 140 includes the fourth connection node 101d, the fifth connection node 101e, and the third connection node 101c in sequence. The fourth layout unit 150 includes the sixth connection node 101f, the seventh connection node 101g, the fourth connection node 101d, and the first connection node 101a in sequence. The fifth layout unit 160 includes the sixth connection node 101f and the first connection node 101a in sequence.

In addition, the first layout unit 120, the second layout unit 130, the third layout unit 140, the fourth layout unit 150 and the fifth layout unit 160 correspond to the first circuit unit 121, the second circuit unit 131, the third circuit unit 141, the fourth circuit unit 151, and the fifth circuit unit 161 one to one. The first connection node 101a, the second connection node 101b, the third connection node 101c, the fourth connection node 101d, the fifth connection node 101e, the sixth connection node 101f and the seventh connection node 101g correspond to the first circuit node 111a, the second circuit node 111b, the third circuit node 111c, the fourth circuit node 111d, the fifth circuit node 111e, the sixth circuit node 111f, and the seventh circuit node 111g one to one.

With continued reference to FIG. 7 and FIG. 8, for the first layout unit 120, the assessment nodes are the first connection node 101a positioned on the leftmost side and the second connection node 101b positioned on the rightmost side. For the second layout unit 130, the assessment nodes are the fifth connection node 101e positioned on the leftmost side and the second connection node 101b positioned on the rightmost side. For the third layout unit 140, the assessment nodes are the fourth connection node 101d positioned on the leftmost side and the third connection node 101c positioned on the rightmost side. For the fourth layout unit 150, the assessment nodes are the sixth connection node 101f positioned on the leftmost side and the first connection node 101a positioned on the rightmost side. For the fifth layout unit 160, the assessment nodes are the sixth connection node 101f positioned on the leftmost side and the first connection node 101a positioned on the rightmost side.

If the first layout unit 120 is determined as the target layout unit, the leftmost first connection node 101a is first determined as the assessment node. Referring to FIG. 7, it may be seen that the first connection nodes 101a in the rest of the plurality of layout units 100 having the same node information as this leftmost first connection node 101a are all positioned on the right side of the first layout unit 120. In this case, the first connection node 101a in the first layout unit 120 does not satisfy the first condition. Next, the rightmost second connection node 101b is determined as the assessment node 7. Referring to FIG. 7, it may be seen that the second connection nodes 101b in the rest of the plurality of layout units 100 having the same node information as this rightmost second connection node 101b are all positioned on the right side of the first layout unit 120. In this case, the second connection node 101b in the first layout unit 120 satisfies the first condition, and thus the first layout unit 120 does not need to be flipped.

If the second layout unit 130 is determined as the target layout unit, the leftmost fifth connection node 101e is first determined as the assessment node. Referring to FIG. 7, it may be seen that the fifth connection nodes 101e in the rest of the plurality of layout units 100 having the same node information as this leftmost fifth connection node 101e are all positioned on the right side of the second layout unit 130. In this case, the fifth connection node 101e in the second layout unit 130 does not satisfy the first condition. Next, the rightmost second connection node 101b is determined as the assessment node. Referring to FIG. 7, it may be seen that the second connection nodes 101b in the rest of the plurality of layout units 100 having the same node information as this rightmost second connection node 101b are all positioned on the right side of the second layout unit 130. In this case, the second connection node 101b in the second layout unit 130 does not satisfy the second condition, and thus the second layout unit 130 needs to be flipped.

If the third layout unit 140 is determined as the target layout unit, the leftmost fourth connection node 101d is first determined as the assessment node. Referring to FIG. 7, it may be seen that the fourth connection nodes 101d in the rest of the plurality of layout units 100 having the same node information as this leftmost fourth connection node 101d are all positioned on the right side of the third layout unit 140. In this case, the fourth connection node 101d in the third layout unit 140 does not satisfy the first condition. Next, the rightmost third connection node 101c is determined as the assessment node. Referring to FIG. 7, it may be seen that the third connection nodes 101c in the rest of the plurality of layout units 100 having the same node information as this rightmost third connection node 101c are all positioned on the left side of the third layout unit 140. In this case, the third connection node 101c in the third layout unit 140 does not satisfy the first condition, and thus the third layout unit 140 needs to be flipped.

If the fourth layout unit 150 is determined as the target layout unit, the leftmost sixth connection node 101f is first determined as the assessment node. Referring to FIG. 7, it may be seen that the sixth connection nodes 101f in the rest of the plurality of layout units 100 having the same node information as this leftmost sixth connection node 101f are all positioned on the right side of the fourth layout unit 150. In this case, the sixth connection node 101f in the fourth layout unit 150 does not satisfy the first condition. Although the rightmost first connection node 101a is determined as the assessment node, referring to FIG. 7, it may be seen that the first connection nodes 101a in the rest of the plurality of layout units 100 having the same node information as this rightmost first connection node 101a are positioned on two sides of the fourth layout unit 150. In this case, the first connection node 101a in the fourth layout unit 150 satisfies the second condition, but neither the sixth connection node 101f nor the first connection node 101a in the fourth layout unit 150 satisfies the first condition, and thus the fourth layout unit 150 needs to be flipped.

If the fifth layout unit 160 is determined as the target layout unit, the leftmost sixth connection node 101f is first determined as the assessment node. Referring to FIG. 7, it may be seen that the sixth connection nodes 101f in the rest of the plurality of layout units 100 having the same node information as this leftmost sixth connection node 101f are all positioned on the left side of the fifth layout unit 160. In this case, the sixth connection node 101f in the fifth layout unit 160 satisfies the first condition. Next, the rightmost first connection node 101a is determined as the assessment node. Referring to FIG. 7, it may be seen that the first connection nodes 101a in the rest of the plurality of layout units 100 having the same node information as this rightmost first connection node 101a are all positioned on the left side of the fifth layout unit 160. In this case, the first connection node 101a in the fifth layout unit 160 does not satisfy the first condition, and thus the fifth layout unit 160 does not need to be flipped.

After the position information of all the assessment nodes of the five layout units 100 in FIG. 7 is compared to determine whether to perform a position flip on the target layout unit, the schematic layout structure diagram as shown in FIG. 8 is obtained. Referring to FIG. 7 and FIG. 8, as can be seen, it is changed from four tracks needing to be occupied in the layout in FIG. 7 to three tracks needing to be occupied in the layout in FIG. 8, while accuracy of routings between the connection nodes is ensured, and the total length of the routings is shortened. This is advantageous to shortening the resistance of the routings in the circuit formed according to the layout in FIG. 8, improving the consistency of the direction of current in the circuit, and reducing the signal delay of the circuit.

To sum up, it is compared a position between the connection nodes 101 in rest of the plurality of layout units 100 having the same node information as the assessment nodes in the target layout unit 110 and the assessment nodes, to determine whether to perform a position flip on the target layout unit 110, such that the position information of the target layout unit 110 flipped satisfies the preset condition, thereby optimizing placement of the plurality of layout units 100. In one aspect, this is advantageous to reducing tracks occupied by the routing, and reducing the opposite regions between the adjacent routings to reduce the interference between the adjacent routings. In another aspect, this is advantageous to shortening the length of the routing, reducing the resistance of the routings in the circuit formed according to this layout, and improving the consistency of the direction of current in the circuit to reduce the signal delay of the circuit.

Another embodiment of the present disclosure also provides a circuit layout, which is formed according to the layout formed by the method for layout placement and routing provided by the foregoing embodiments. It is to be noted that contents corresponding to the foregoing embodiments will not be described in detail below.

The circuit layout includes a plurality of circuit units arranged along a preset direction, wherein each of the plurality of circuit units has a plurality of connection nodes arranged along the preset direction, and each of the plurality of connection nodes has corresponding node information. Two of the plurality of connection nodes at two ends of each of the plurality of circuit units are defined as assessment nodes, wherein at least one of the plurality of circuit units serves as a first target circuit unit. In the preset direction, the connection nodes in rest of the plurality of circuit units having the same node information as a given one of the assessment nodes in the first target circuit unit are defined as a homogeneous node group, and the homogeneous node group is distributed on one side of the given assessment node away from the other assessment node in the first target circuit unit. The circuit layout also includes a routing configured to electrically connect the connection nodes having the same node information.

In this way, it is advantageous to preventing the connection nodes in the homogeneous node group from being distributed on one side of the given assessment node close to the other assessment node, i.e., allowing the connection nodes in the homogeneous node group to get as close as possible to the given assessment node. Thus, it is advantageous to shortening a distance between the connection nodes in the homogeneous node group and the given assessment node to reduce the length of the routing configured to electrically connect the connection nodes having the same node information, which is advantageous to reducing resistance of the routing in the circuit layout. Moreover, it is advantageous to reducing opposite regions between adjacent routings to reduce interference between the adjacent routings, and it is advantageous to improving consistency of direction of current in the circuit layout to reduce signal delay of the circuit layout.

In some embodiments, the circuit layout may also include at least one of the plurality of circuit units serving as a second target circuit unit. For the second target circuit unit, in the preset direction, the connection nodes in the rest of the plurality of circuit units having the same node information as the given assessment node in the second target circuit unit are distributed on two sides of the given assessment node.

In some embodiments, the node information includes an input port and/or an output port.

To sum up, in the circuit layout formed by the layout formed according to the method for layout placement and routing provided in the foregoing embodiments, the distance between the connection nodes in the homogeneous node group and the given assessment node is shorter, so the length of the routing configured to electrically connect the connection nodes having the same node information is shorter, which is advantageous to reducing the resistance of the routing. Moreover, it is advantageous to reducing the opposite regions between the adjacent routings to reduce the interference between the adjacent routings, and it is advantageous to improving the consistency of the direction of current in the circuit layout to reduce the signal delay of the circuit layout.

Figure 9:
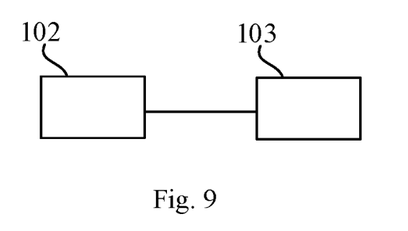
FIG. 9 is a schematic structural diagram of an electronic device according to another embodiment of the present disclosure.

Yet another embodiment of the present disclosure also provides an electronic device configured to perform the method for layout placement and routing provided by the foregoing embodiments. The electronic device provided by yet another embodiment of the present disclosure will be described in detail below with reference to the accompanying drawings. FIG. 9 is a schematic structural diagram of the electronic device according to yet another embodiment of the present disclosure.

Referring to FIG. 9, the electronic device includes: at least one processor 102; and a memory 103 communicatively connected to the at least one processor 102, wherein the memory 103 stores instructions executable by the at least one processor 102. The instructions are executable by the at least one processor 102, whereby the at least one processor 102 can perform the method for layout placement and routing provided by the foregoing embodiments, to achieve optimization of layout placement and routing, reduce the tracks occupied by the routing, reduce the opposite regions between the adjacent routings, and shorten the length of the routing. Thus, it is advantageous to reducing the resistance of the routing in the circuit formed according to the layout, and it is advantageous to improving the consistency of the direction of current in the circuit to reduce the signal delay of the circuit.

Still another embodiment of the present disclosure also provides a computer-readable storage medium configured to implement the method for layout placement and routing provided by the foregoing embodiments. The computer-readable storage medium stores a computer program. The computer program is executable by a processor, whereby the method for layout placement and routing provided by the foregoing embodiments is implemented, to achieve the optimization of the layout placement and routing, reduce the tracks occupied by the routing, reduce the opposite regions between the adjacent routings, and shorten the length of the routing. Thus, it is advantageous to reducing the resistance of the routing in the circuit formed according to the layout, and it is advantageous to improving the consistency of the direction of current in the circuit to reduce the signal delay of the circuit.

Those of ordinary skill in the art can understand that the above-mentioned embodiments are some embodiments for realizing the present disclosure, but in practical applications, various changes can be made to them in form and details without departing from the spirit and scope of the embodiments of the present disclosure. Any person skilled in the art can make their own changes and modifications without departing from the spirit and scope of the embodiments of the present disclosure. Therefore, the protection scope of the embodiments of the present disclosure shall be subject to the scope defined by the claims.

What is claimed is:

1. A method for layout placement and routing, comprising:

generating a plurality of layout units arranged along a preset direction based on a schematic circuit diagram, each of the plurality of layout units having a plurality of connection nodes, each of the plurality of connection nodes having corresponding node information, and two of the plurality of connection nodes at two ends of each of the plurality of layout units being defined as assessment nodes;

determining any one of the plurality of layout units as a target layout unit, and obtaining position information of the assessment nodes in the target layout unit, the position information being configured for representing a positional relationship between the connection nodes in rest of the plurality of layout units having same node information as the assessment nodes in the target layout unit and the assessment nodes;

determining whether to perform a position flip on the target layout unit based on the positional relationship, and flipping the target layout unit if the determination result is YES, such that the position information of the target layout unit flipped satisfies a preset condition; and performing routing to electrically connect the connection nodes having the same node information.

2. The method for layout placement and routing according to claim 1, wherein in the preset direction, the connection nodes in the rest of the plurality of layout units having the same node information as a given one of the assessment nodes in the target layout unit are defined as a homogeneous node group, the preset condition comprising:

all the connection nodes in the homogeneous node group being distributed on one side of the given assessment node away from the other assessment node in the target layout unit, or the connection nodes in the homogeneous node group being distributed on two sides of the given assessment node.

3. The method for layout placement and routing according to claim 1, wherein in the preset direction, the connection nodes in the rest of the plurality of layout units having the same node information as a given one of the assessment nodes in the target layout unit are defined as a homogeneous node group, the determining whether to perform a position flip on the target layout unit based on the positional relationship comprising:

determining whether at least one of the assessment nodes in the target layout unit satisfies a first condition;

not flipping the target layout unit if the determination result is YES; and flipping the target layout unit to exchange positions of the two assessment nodes if the determination result is NO;

wherein the first condition is that in the preset direction, the connection nodes in the homogeneous node group are distributed on one side of the given assessment node away from the other assessment node in the target layout unit.

4. The method for layout placement and routing according to claim 3, wherein the determining whether to perform a position flip on the target layout unit based on the positional relationship comprises:
  determining whether the assessment nodes at two ends of the target layout unit satisfy a second condition; and
  not flipping the target layout unit if the determination result is YES;
  wherein the second condition is that the connection nodes in the homogeneous node group are distributed on two sides of the given assessment node.

5. The method for layout placement and routing according to claim 3, wherein the determining whether to perform a position flip on the target layout unit based on the positional relationship comprises:
  determining whether the assessment nodes at the two ends of the target layout unit satisfy a second condition, wherein the second condition is that the connection nodes in the homogeneous node group are distributed on two sides of the given assessment node;
  flipping the target layout unit if the determination result is YES;
  determining whether a length of the routing in a layout before flip is less than or equal to that of the routing in the layout after the flip;
  flipping the target layout unit again if the determination result is YES; and
  not flipping the target layout unit if the determination result is NO.

6. The method for layout placement and routing according to claim 3, wherein before performing the routing, the method further comprises:
  traversing all the plurality of layout units until each of the plurality of layout units completes the step of determining whether to perform a position flip on the target layout unit.

7. The method for layout placement and routing according to claim 6, wherein all the plurality of layout units are traversed in sequence in the preset direction.

8. The method for layout placement and routing according to claim 1, wherein any one of the plurality of layout units is determined as the target layout unit, the two assessment nodes in the target layout unit being determined as a first assessment node and a second assessment node respectively; in the preset direction, rest of the plurality of connection nodes having the same node information as the first assessment node being defined as a first homogeneous node group, and rest of the plurality of connection nodes having the same node information as the second assessment node being defined as a second homogeneous node group;
  the obtaining position information of the assessment nodes in the target layout unit comprises:
  obtaining first position information of the first assessment node, and obtaining second position information of the second assessment node;
  the determining whether to perform a position flip on the target layout unit based on the positional relationship comprises:
  determining whether the position information conforms to at least one of the first position information representing that the connection nodes in the first homogeneous node group being distributed on one side of the first assessment node away from the second assessment node and the second position information representing that the connection nodes in the second homogeneous node group being distributed on one side of the second assessment node away from the first assessment node; and
  not flipping the target layout unit if the determination result is YES.

9. The method for layout placement and routing according to claim 8, wherein the determining whether to perform a position flip on the target layout unit based on the positional relationship further comprises:
  determining whether the position information conforms to the first position information representing that the connection nodes in the first homogeneous node group being distributed on two sides of the first assessment node and the connection nodes in the second homogeneous node group being distributed on two sides of the second assessment node; and
  not flipping the target layout unit if the determination result is YES.

10. The method for layout placement and routing according to claim 8, wherein the determining whether to perform a position flip on the target layout unit based on the positional relationship further comprises:
  flipping the target layout unit to exchange positions of the first assessment node and the second assessment node if the determination result is NO.

11. The method for layout placement and routing according to claim 1, wherein the generating a plurality of layout units arranged along a preset direction comprises:
  dividing the schematic circuit diagram into a plurality of circuit units according to functions; and
  generating a given one of the plurality of layout units corresponding to each of the plurality of circuit units by means of a physical layout unit library.

12. The method for layout placement and routing according to claim 11, wherein the generating a given one of the plurality of layout units corresponding to each of the plurality of circuit units by means of a physical layout unit library comprises:
  obtaining circuit data and layout data based on the circuit unit;
  obtaining all circuit node information based on the circuit data;
  obtaining all layout node information based on the layout data; and
  generating the given layout unit based on the circuit node information and the layout node information, and the node information of the plurality of connection node being generated based on the circuit node information and the layout node information.

13. The method for layout placement and routing according to claim 1, wherein the node information comprises an input port and/or an output port.

14. A circuit layout, comprising:
  a plurality of circuit units arranged along a preset direction, each of the plurality of circuit units having a plurality of connection nodes arranged along the preset direction, each of the plurality of connection nodes having corresponding node information, and two of the plurality of connection nodes at two ends of each of the plurality of circuit units being defined as assessment nodes;
  wherein at least one of the plurality of circuit units serves as a first target circuit unit, and in the preset direction, the connection nodes in rest of the plurality of circuit units having same node information as a given one of the assessment nodes in the first target circuit unit being defined as a homogeneous node group, and the homogeneous node group being distributed on one side of the given assessment node away from the other assessment node in the first target circuit unit; and a routing configured to electrically connect the connection nodes having the same node information.

15. The circuit layout according to claim 14, further comprising: at least one of the plurality of circuit units serving as a second target circuit unit, for the second target circuit unit, in the preset direction, the connection nodes in the rest of the plurality of circuit units having the same node information as the given assessment node in the second target circuit unit being distributed on two sides of the given assessment node.

16. The circuit layout according to claim 14, wherein the node information comprises an input port and/or an output port.

17. An electronic device, comprising:
   at least one processor; and
   a memory communicatively connected to the at least one processor; wherein
   the memory stores instructions executable by the at least one processor, and the instructions are executable by the at least one processor, whereby the at least one processor is configured to perform a method for layout placement and routing, wherein the method comprises:
   generating a plurality of layout units arranged along a preset direction based on a schematic circuit diagram, each of the plurality of layout units having a plurality of connection nodes, each of the plurality of connection nodes having corresponding node information, and two of the plurality of connection nodes at two ends of each of the plurality of layout units being defined as assessment nodes;
   determining any one of the plurality of layout units as a target layout unit, and obtaining position information of the assessment nodes in the target layout unit, the position information being configured for representing a positional relationship between the connection nodes in rest of the plurality of layout units having same node information as the assessment nodes in the target layout unit and the assessment nodes;
   determining whether to perform a position flip on the target layout unit based on the positional relationship, and flipping the target layout unit if the determination result is YES, such that the position information of the target layout unit flipped satisfies a preset condition; and
   performing routing to electrically connect the connection nodes having the same node information.

* * * * *